United States Patent
Ha et al.

(10) Patent No.: US 11,473,812 B2
(45) Date of Patent: Oct. 18, 2022

(54) CONTROL METHOD OF GAS FURNACE

(71) Applicant: LG ELECTRONICS INC., Seoul (KR)

(72) Inventors: Doyong Ha, Seoul (KR); Yongki Jeong, Seoul (KR); Janghee Park, Seoul (KR); Jusu Kim, Seoul (KR); Hansaem Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 366 days.

(21) Appl. No.: 16/726,364

(22) Filed: Dec. 24, 2019

(65) Prior Publication Data
US 2020/0208879 A1 Jul. 2, 2020

(30) Foreign Application Priority Data
Dec. 26, 2018 (KR) .................. 10-2018-0169080

(51) Int. Cl.
*F24H 9/20* (2022.01)
*F24H 3/08* (2022.01)

(52) U.S. Cl.
CPC ........... *F24H 9/2085* (2013.01); *F24H 3/087* (2013.01)

(58) Field of Classification Search
CPC ........ F24H 9/2085; F24H 3/087; F24F 11/85; F24F 11/84; F24F 11/83; F24F 11/81; F24F 11/80; F24F 11/70; F24F 11/30; F24F 11/875; F24F 11/873; F24F 11/871; F24F 11/87; F24F 11/86; F24F 2140/50; F24F 2110/10
See application file for complete search history.

(56) References Cited

U.S. PATENT DOCUMENTS

| | | | | |
|---|---|---|---|---|
| 6,758,208 B2* | 7/2004 | Gierula | ............. | F24H 3/087 |
| | | | | 236/11 |
| 6,925,999 B2* | 8/2005 | Hugghins | ............. | F23N 1/002 |
| | | | | 126/110 A |
| 7,101,172 B2* | 9/2006 | Jaeschke | ............. | F23N 3/08 |
| | | | | 126/116 A |
| 8,275,484 B2* | 9/2012 | Lorenz | ............. | F24H 9/2085 |
| | | | | 251/30.01 |
| 8,925,541 B2* | 1/2015 | Thompson | ............. | F23N 1/102 |
| | | | | 126/110 A |
| 9,494,333 B2* | 11/2016 | Broker | ............. | G05B 23/0208 |
| 2002/0092516 A1* | 7/2002 | Gierula | ............. | F24H 3/087 |
| | | | | 126/110 R |
| 2003/0059730 A1 | 3/2003 | Sigafus et al. | | |

(Continued)

OTHER PUBLICATIONS

European Search Report dated Jul. 6, 2020 issued in EP Application No. 19219777.0.

*Primary Examiner* — Jenna M Hopkins
(74) *Attorney, Agent, or Firm* — Ked & Associates, LLP (57) ABSTRACT

A method for controlling a gas furnace that performs a heating operation by receiving a first heating signal; calculating a certain heating capacity smaller than a maximum heating capacity of the gas furnace, according to the first heating signal; and operating a heating of the gas furnace with the calculated certain heating capacity. The calculating of the certain heating capacity includes calculating the certain heating capacity according to a difference between an intake air temperature sucked into the gas furnace and a reference temperature.

10 Claims, 5 Drawing Sheets

(56) References Cited

U.S. PATENT DOCUMENTS

| | | | |
|---|---|---|---|
| 2006/0275719 A1* | 12/2006 | Hill | F23N 5/20 |
| | | | 431/24 |
| 2008/0127963 A1 | 6/2008 | Thompson | |
| 2009/0127346 A1* | 5/2009 | Grohman | F24D 19/1084 |
| | | | 236/10 |
| 2010/0009302 A1* | 1/2010 | Nordberg | F23N 1/02 |
| | | | 431/12 |
| 2012/0080023 A1 | 4/2012 | Thompson | |
| 2017/0176048 A1 | 6/2017 | Schneider et al. | |
| 2020/0208879 A1* | 7/2020 | Ha | F24H 9/2085 |
| 2021/0199292 A1* | 7/2021 | Ha | G05D 23/19 |
| 2021/0215340 A1* | 7/2021 | Kim | F24H 3/065 |

* cited by examiner

| REFERENCE TEMPERATURE<br>– INTAKE AIR TEMPERATURE<br>= TEMPERATURE DIFFERENCE Td(°F) | WEAK HEATING CAPACITY<br>(IN COMPARISON WITH<br>STARTING CAPACITYY) |
|---|---|
| $1.5 \leq Td < 2.0$ | INCREASED BY 5% |
| $1.0 \leq Td < 1.5$ | INCREASED BY 3% |
| $0.5 \leq Td < 1.0$ | INCREASED BY 1% |
| $-0.5 < Td < 0.5$ | MAINTAINED |
| $-1 < Td \leq -0.5$ | REDUCED BY 3% |
| $Td \leq -1$ | REDUCED BY 5% |

FIG. 5

CONTROL METHOD OF GAS FURNACE

CROSS REFERENCE TO RELATED APPLICATIONS

This application claims the priority benefit of Korean Patent Application No. 10-2018-0169080, filed on Dec. 26, 2018 in the Korean Intellectual Property Office, the disclosure of which is incorporated herein by reference.

BACKGROUND OF THE INVENTION

1. Field of the Invention

The present invention relates to a control method of a gas furnace, and more particularly, to a method of controlling a gas furnace by controlling a heating capacity in a stepwise manner by comparing a temperature of air sucked into a gas furnace with a reference temperature, thereby maintaining a room temperature close to a set heating temperature.

2. Description of the Related Art

Generally, a gas furnace is an apparatus that heats indoor air by supplying air, to a room, that exchanged heat with a flame and a high temperature combustion gas that are generated when the fuel gas is burned.

It is necessary to control the heating capacity of the gas furnace so that the room temperature can be maintained close to a set temperature.

The control method of the gas furnace according to the related art has a problem that it is difficult to maintain the room temperature close to the set temperature as the heating capacity of the gas furnace can not be adjusted to the current load.

In order to solve such a problem, the gas furnace is operated with a plurality of preset heating capacities, but the heating capacity of the gas furnace is not adjusted in a stepwise manner according to the current load, so that it is difficult to cope with various heating loads.

Further, since the heating capacity of the gas furnace is not adjusted according to the current load, there is a problem that more fuel gas is consumed than necessary.

Meanwhile, there is not proposed a method for adjusting the heating capacity of the gas furnace in a stepwise manner without communication with the temperature control device installed in the room, excluding the method of receiving a heating signal.

SUMMARY OF THE INVENTION

The present invention has been made in view of the above problems, and provides a control method of a gas furnace which can adjust the heating capacity of a gas furnace in a stepwise manner according to a current load.

The present invention further provides a control method of a gas furnace which can adjust the heating capacity autonomously based on internal information of a gas furnace.

In accordance with an aspect of the present invention, a method of controlling a gas furnace that performs heating operation according to a heating signal formed of one of a weak heating signal and a strong heating signal, includes the steps of: (a) receiving the heating signal; (b) determining whether the heating signal is the weak heating signal or the strong heating signal; (c) calculating a certain weak heating capacity smaller than a maximum heating capacity of the gas furnace, when the heating signal is the weak heating signal; and (d) operating a weak heating of the gas furnace with the calculated certain weak heating capacity, wherein the step (c) includes calculating the weak heating capacity according to a difference between a temperature of air (hereinafter, an intake air temperature) sucked into the gas furnace and a reference temperature set based on the intake air temperature.

The intake air temperature is variable over time, and the reference temperature is set to any one of temperatures, based on the intake air temperature at a certain time point among the variable intake air temperature.

The reference temperature is set to a temperature higher than the intake air temperature by 0.5 to 2.5° F. at the certain time point.

The step (c) includes: determining whether the gas furnace is in operation according to a previously received certain heating signal (hereinafter, a previous signal); determining whether the previous signal is the weak heating signal or the strong heating signal, when the gas furnace is in operation; calculating the weak heating capacity according to a difference between the intake air temperature and the reference temperature, wherein the reference temperature becomes a reference temperature in the previous signal, when the previous signal is the weak heating signal, and when the heating signal is also the weak heating signal without a signal change; calculating the weak heating capacity according to the difference between the intake air temperature and the reference temperature, wherein the reference temperature is set based on the intake air temperature at a time point of signal change, when the previous signal is the strong heating signal and the heating signal is the weak heating signal as signal is changed.

The step (c) includes: sucking air into the gas furnace for a certain time, if the gas furnace is not in operation; and calculating the weak heating capacity according to the difference between the intake air temperature and the reference temperature, wherein the reference temperature is set based on the intake air temperature after the certain time.

Sucking air into the gas furnace is maintained for 15 to 45 seconds by using a blower provided in the gas furnace.

The weak heating capacity is varied in a stepwise manner according to a magnitude of a value (hereinafter, 'temperature difference') obtained by subtracting the intake air temperature from the reference temperature, based on a preset starting capacity.

The weak heating capacity is maintained to be identical with the starting capacity, when the temperature difference is within a first reference range.

The weak heating capacity is increased by a certain ratio from the starting capacity when the temperature difference is within a second reference range which is larger than the first reference range.

The weak heating capacity is reduced by a certain ratio from the starting capacity when the temperature difference is within a third reference range which is smaller than the first reference range.

The method further includes storing the reference temperature, and calculating the weak heating capacity includes calculating the weak heating capacity based on the stored reference temperature.

After the step (b), the method further includes operating a strong heating of the gas furnace at the maximum heating capacity of the gas furnace, when the heating signal is the strong heating signal.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In this specification, the Fahrenheit temperature (° F.) is used as a unit of temperature, but it is obvious that the present invention can be applied to the Celsius temperature (° C.) system.

Hereinafter, a gas furnace according to an embodiment of the present invention will be described with reference to FIG. 1.

Figure 1:
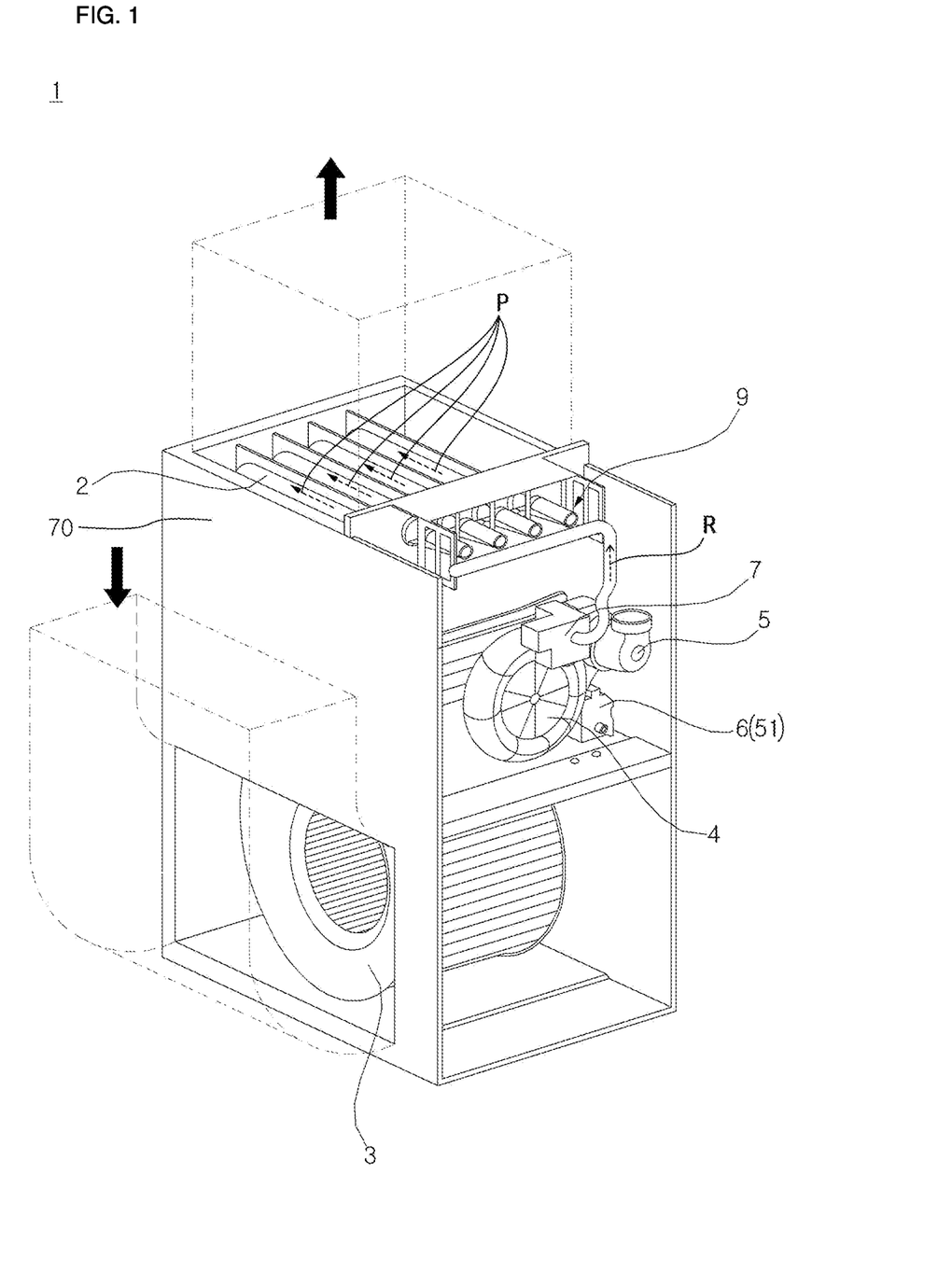
FIG. 1 is a perspective view of a gas furnace according to the present invention.

FIG. 1 is a perspective view of a gas furnace according to an embodiment of the present invention.

A gas furnace 1 is an apparatus for heating a room by supplying a flame and a high temperature combustion gas P that are generated when the fuel gas R is burned.

As shown in FIG. 1, the gas furnace 1 includes a burner 9 in which a fuel gas R is burnt to generate a combustion gas P, a heat exchanger 2 in which a flow path for flowing a combustion gas P is formed, a blower 3 for gas furnace, and an inducer 4.

The fuel gas R may be burned in a venturi tube of the burner 9 to generate a flame and a combustion gas P.

Generally, liquefied natural gas (LNG) obtained by cooling and liquefying natural gas, or liquefied petroleum gas (LPG) obtained by pressurizing and liquefying a gas obtained as a byproduct of a petroleum refining process may be used as the fuel gas R.

The fuel gas R may be injected into a manifold from a gas valve 7 and sprayed toward the venturi tube through a nozzle (not shown).

A gas pipe through which the fuel gas R passes may be disposed between the gas valve 7 and the manifold. The gas valve 7 may be connected to the manifold via the gas pipe.

The gas valve 7 may open or close all or a part of the gas pipe.

That is, the gas valve 7 may adjust the intensity of the thermal power of the gas furnace 1 by adjusting the amount of the fuel gas R flowing into the manifold.

The room can be heated by passing the air supplied to the room around the heat exchanger 2 through which the flame and the combustion gas P pass.

The heat exchanger 2 may be constituted by a first heat exchanger and a second heat exchanger.

One end of the first heat exchanger may be disposed adjacent to the burner 9. The other end opposite to one end of the first heat exchanger may be coupled to a coupling box (not shown). The combustion gas P passing from one end of the first heat exchanger to the other end may be transferred to the second heat exchanger through the coupling box.

One end of the second heat exchanger may be connected to the coupling box. The combustion gas P passed through the first heat exchanger may flow into one end of the second heat exchanger and pass through the second heat exchanger.

The second heat exchanger may perform heat exchange once again between the combustion gas P passed through the first heat exchanger and the air passing around the second heat exchanger.

That is, the efficiency of the gas furnace 1 may be improved by further utilizing the thermal energy of the combustion gas P that has passed through the first second heat exchanger through the second heat exchanger.

The combustion gas P passing through the second heat exchanger is condensed through a process of heat transfer with the air passing around the second heat exchanger to generate condensed water. In other words, the water vapor contained in the combustion gas P may be condensed and change state to condensed water.

For this reason, a gas furnace having the first heat exchanger and the second heat exchanger may be referred to as a condensing gas furnace.

The condensed water generated at this time may be collected in a condensed water collecting part (not shown). To this end, the other end opposite to one end of the second heat exchanger may be connected to one side of the condensed water collecting part.

An inducer 4 described later may be coupled to the other side of the condensed water collecting part. Hereinafter, for the sake of simplicity, it is described that the inducer 4 is coupled to the condensed water collecting part, but the inducer 4 may be coupled to a mounting plate to which the condensed water collecting part is coupled.

An opening may be formed in the condensed water collecting part. The other end of the second heat exchanger and the inducer 4 may communicate with each other by the medium of the opening formed in the condensed water collecting part.

That is, the combustion gas P that passed through the other end of the second heat exchanger may escape to the inducer 4 through the opening formed in the condensed water collecting part, and then may be discharged to the outside of the gas furnace 1 via an exhaust pipe 5.

The condensed water generated in the second heat exchanger may escape to a condensed water trap 51 through the condensed water collecting part, and then may be discharged to the outside of the gas furnace 1 via a discharge port.

At this time, the condensed water trap 51 may be coupled to the other side of the condensed water collecting part. The condensed water trap 51 may collect not only the condensed water generated in the second heat exchanger but also the condensed water generated in the exhaust pipe 5 connected to the inducer 4, and discharged.

That is, the condensed water generated when the combustion gas P which is not yet condensed in the other end of the second heat exchanger is condensed through the exhaust pipe 5 may also be collected by the condensed water trap 6, and may be discharged to the outside of the gas furnace 1 via the discharge port.

The inducer 4 may communicate with the other end of the second heat exchanger by the medium of the opening formed in the condensed water collecting part.

One end of the inducer 4 is coupled to the other side of the condensed water collecting part, and the other end of the inducer 4 may be coupled to the exhaust pipe 5.

The inducer 4 may induce a flow stream in which the combustion gas P passes through the first heat exchanger, the coupling box, and the second heat exchanger and is discharged to the exhaust pipe 5. In this regard, the inducer 4 may be understood as an Induced Draft Motor (IDM).

The blower 3 for gas furnace may be positioned below the gas furnace 1. The air supplied to the room may be moved from the lower portion of the gas furnace 1 to the upper portion by the blower 3 for gas furnace. In this regard, the blower 3 for gas furnace may be understood as Indoor Blower Motor (IBM).

The blower 3 for gas furnace may pass air around the heat exchanger 2.

The air passing around the heat exchanger 2 by the blower 3 for gas furnace may receive the thermal energy from the high temperature combustion gas P by the medium of the heat exchanger 2 so that the temperature can be raised. The air whose temperature is raised is supplied to the room, so that the room can be heated.

The gas furnace 1 may include a case (not shown). The configurations of the gas furnace 1 described above may be accommodated inside the case 70. In a lower portion of the case 70, a lower opening (not shown) may be formed in a side surface adjacent to the blower 3 for gas furnace. Air passing around the heat exchanger 2 through the lower opening may be introduced into the case 70.

An opening (not shown) for the exhaust pipe through which the exhaust pipe 5 passes may be formed in the upper portion of the case, but the position is not limited thereto.

In the upper portion of the case 70, an upper opening (not shown) may be formed in a side surface adjacent to the upper side of the heat exchanger 2. The air that passed around the heat exchanger 2 through the upper opening and has a risen temperature may be discharged to the outside of the case 70 and supplied to the room.

The lower opening and the upper opening may be provided with a duct (not shown) for communicating the indoor space which is a heating target with the gas furnace 1.

A filter (not shown) may be installed between the lower opening and the duct installed therein so as to filter foreign substances such as dust in the air.

As described above, since the second heat exchanger is configured to additionally use the thermal energy of the combustion gas P that passed through the first heat exchanger, it may be easily understood that the efficiency of the gas furnace using the first and second heat exchangers is better than that of the gas furnace using only the first heat exchanger.

The control method of the gas furnace according to the embodiment of the present invention may be applied not only to the gas furnace to which only the first heat exchanger is applied, but also to the gas furnaces to which the first heat exchanger and the second heat exchanger are applied.

As described above, the thermal power of the gas furnace 1 can be adjusted by using the gas valve 7. Hereinafter, the thermal power of the gas furnace 1 may be referred to as the heating capacity of the gas furnace.

At this time, when the gas furnace 1 is operated only at a preset heating capacity without considering the difference between the room temperature and the set heating temperature, an overshoot in which the room temperature deviates greatly from the set heating temperature may frequently occur.

Further, if the heating capacity of the gas furnace 1 is calculated more than the heat amount required for the room temperature to reach the set heating temperature, there may occur a problem that the consumption amount of the fuel gas R increases more than necessary.

The present invention has been made in order to solve this problem.

Hereinafter, a method of controlling a gas furnace according to an embodiment of the present invention will be described in detail with reference to FIGS. 1 to 5.

Figure 2:
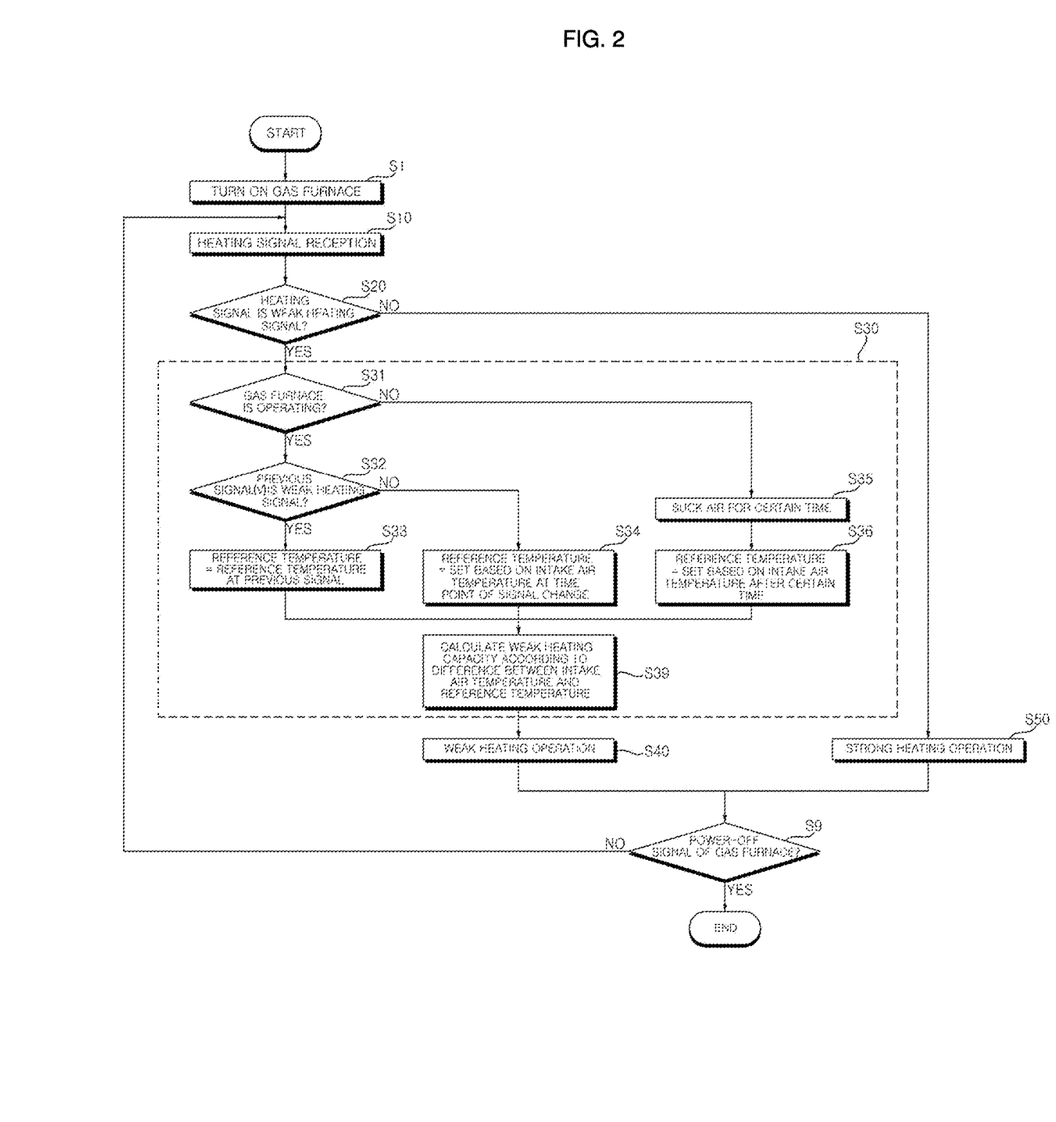
FIG. 2 is a flow chart of a control method of a gas furnace according to an embodiment of the present invention.
Figure 3:
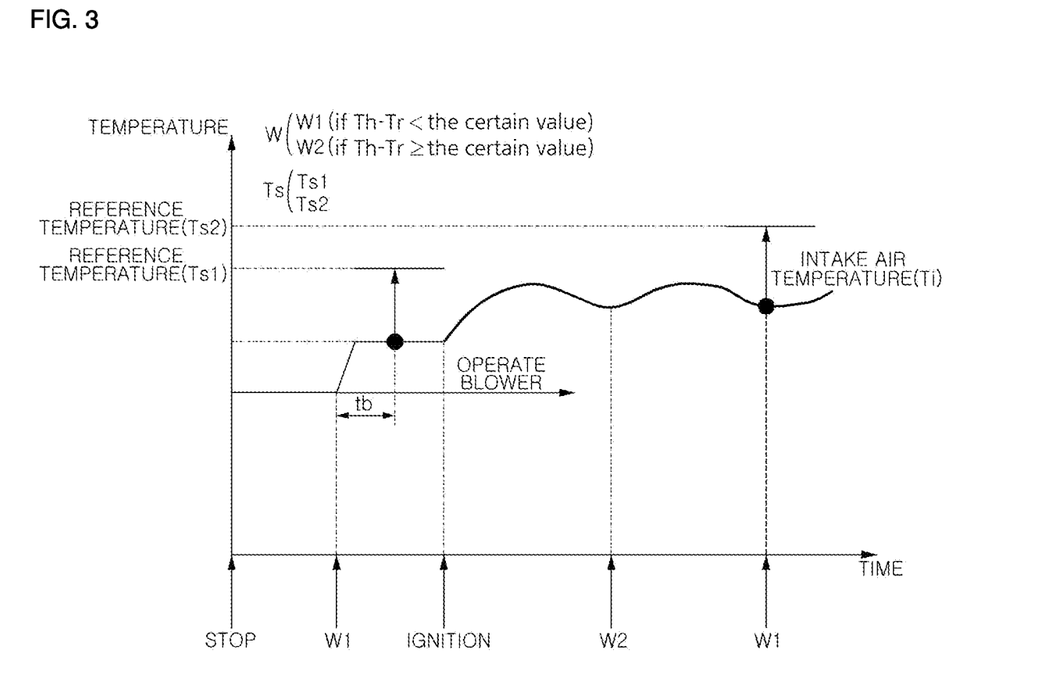
FIG. 3 is a diagram illustrating an example of reference temperature setting according to an embodiment of the present invention.
Figure 4:
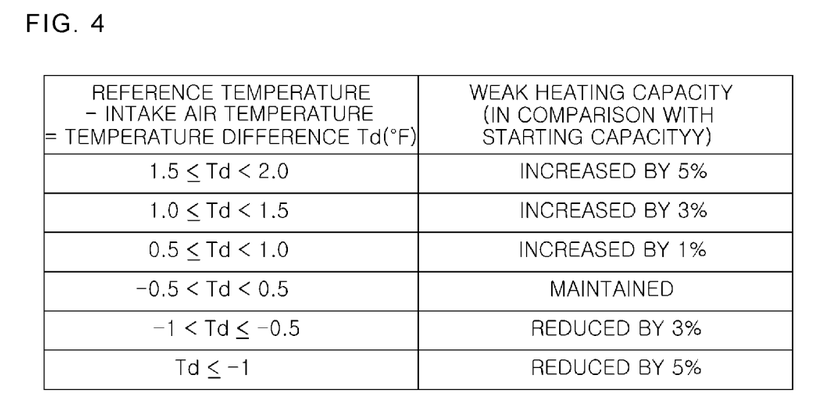
FIG. 4 is a diagram illustrating an example of a method of calculating a weak heating capacity according to an embodiment of the present invention.
Figure 5:
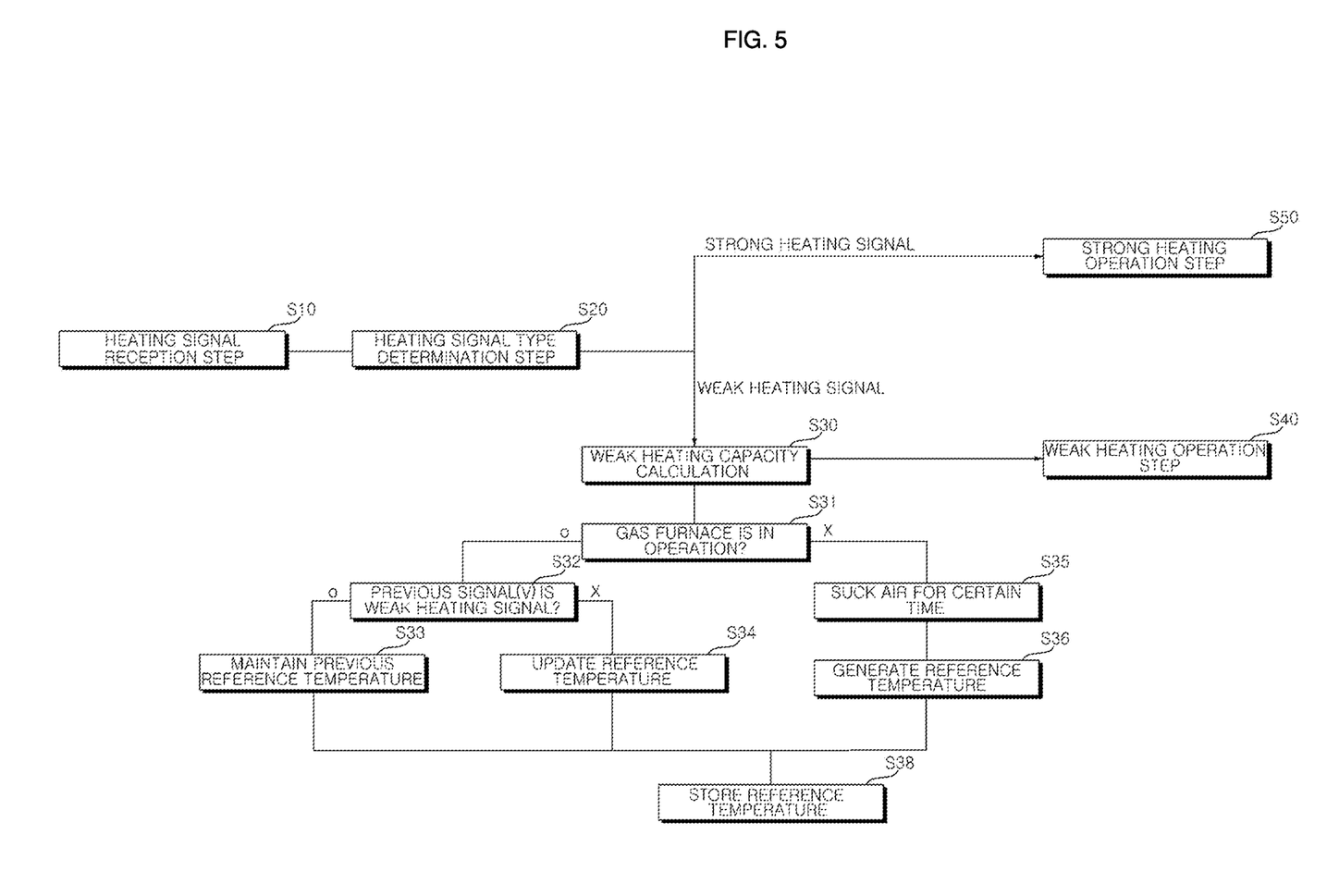
FIG. 5 is a block diagram illustrating a control method of a gas furnace according to an embodiment of the present invention.

FIG. 2 is a flow chart of a control method of a gas furnace according to an embodiment of the present invention, FIG. 3 is a diagram illustrating an example of reference temperature setting according to an embodiment of the present invention, FIG. 4 is a diagram illustrating an example of a method of calculating a weak heating capacity according to an embodiment of the present invention, and FIG. 5 is a block diagram illustrating a control method of a gas furnace according to an embodiment of the present invention.

Each of the steps constituting the control method of the gas furnace 1 according to the embodiment of the present invention described later may be performed through a controller provided in the gas furnace 1.

The controller may be implemented by using at least one of an application specific integrated circuit (ASIC), digital signal processors (DSPs), digital signal processing devices (DSPDs), programmable logic devices (PLDs), field programmable gate arrays (FPGAs), processors, controllers, micro-controllers, microprocessors, and other electronic units for performing other functions.

It will be noted that the control method of the gas furnace 1 according to the embodiment of the present invention described later will be performed after a step S1 of turning on the power supply of the gas furnace 1 is executed.

The gas furnace 1 may be in operation or not be in operation while the gas furnace 1 is turned on.

Here, the fact that the gas furnace 1 is in operation means a case where the fuel gas R flows into the manifold and the venturi tube, and the flame and the combustion gas P of high temperature generated by the combustion of the introduced fuel gas R pass through the interior of the heat exchanger 2.

On the other hand, the fact that the gas furnace 1 is not in operation means a case where the gas valve 7 blocks the inflow of the fuel gas R into the manifold and the venturi tube.

The present invention relates to a control method of a gas furnace that performs heating operation according to a heating signal (W) formed of a weak heating signal (W1) and a strong heating signal (W2).

As shown in FIGS. 2 and 5, the method of controlling a gas furnace according to an embodiment of the present invention includes a heating signal reception step S10, a heating signal type determination step S20, a weak heating capacity calculation step S30, a weak heating operation step S40, and a strong heating operation step S50.

The heating signal reception step S10 is a step of receiving any one of the heating signal W, that is, the weak heating signal W1 and the strong heating signal W2. The weak heating signal W1 and the strong heating signal W2 are signals for instructing a weak heating operation and a strong heating operation described later.

The heating signal W may be a signal transmitted to the gas furnace 1 from a thermostat provided in a room which is a heating target space. The thermostat may include a thermocouple for measuring the room temperature Tr. The thermostat may be a temperature control system which displays the room temperature Tr to the room occupant and to which the occupant can input the set heating temperature Th.

If the difference between the room temperature Tr and the set heating temperature Th is less than a certain value, the thermostat may transmit a weak heating signal W1 to the gas furnace 1. If the difference between the room temperature Tr and the set heating temperature Th is equal to or greater than the certain value, the thermostat may transmit a strong heating signal W2 to the gas furnace 1.

Meanwhile, in the embodiment of the present invention, the thermostat compares the room temperature Tr with the set heating temperature Th to transmit the weak heating signal W1 and the strong heating signal W2 to the gas furnace 1. However, the present invention is not limited thereto, and the occupant may directly transmit the weak heating signal W1 and the strong heating signal W2 to the gas furnace 1 through a manual input.

When the heating signal W is received at step S10, the heating signal type determination step S20 may be performed. The heating signal type determination step S20 may determine whether the heating signal W received at step S10 is the weak heating signal W1 or the strong heating signal W2.

If it is determined at step S20 that the heating signal W is the strong heating signal W2, the strong heating operation step S50 may be performed. The strong heating operation step S50 may be a step of performing a strong heating operation of the gas furnace 10 at the maximum heating capacity of the gas furnace 1. Here, the maximum heating capacity of the gas furnace 1 means the thermal power of the gas furnace 1 when the gas valve 7 is fully opened and the fuel gas R maximally flows into the manifold.

If it is determined at step S20 that the heating signal W is the weak heating signal W1, the weak heating capacity calculation step S30 and the weak heating operation step S40 may be performed sequentially.

The weak heating capacity calculation step S30 may be a step of calculating a certain weak heating capacity smaller than the maximum heating capacity of the gas furnace 1.

The weak heating capacity calculation step S30 may be a step of calculating the weak heating capacity according to the difference between the temperature (hereinafter, referred to as an intake air temperature Ti) of the air sucked into the gas furnace 1 and the reference temperature Ts set based on the intake air temperature Ti.

The intake air temperature Ti may be measured by a temperature sensor installed inside the gas furnace 1. Since the temperature sensor is for measuring the temperature of the air sucked into the gas furnace 1, it is preferable that it is installed adjacent to an intake duct, inside of the gas furnace 1, for introducing indoor air into the gas heater 1.

As an example, the temperature sensor may be installed adjacent to the lower opening of the gas furnace 1.

The intake air temperature Ti can be varied over time, and the reference temperature Ts may be set to any one of the temperatures based on the intake air temperature Ti at a certain time point among the variable intake air temperatures.

As an example, as shown in FIG. 3, the reference temperature Ts may be set to a temperature higher than the intake temperature Ti by about 0.5 to 2.5° F. at the certain time point, and the weak heating capacity may be calculated differently depending on a difference between the reference temperature Ts which is set as described above and the variable intake air temperature Ti, and a detailed description will be given later.

As described above and as described later, the present invention is characterized in that the weak heating capacity can be adjusted by itself in a stepwise manner based on the intake air temperature Ti which is internal information of the gas furnace 1 and the reference temperature Ts, without communication with the thermocouple other than receiving the weak heating signal W1.

In other words, since the weak heating capacity is not calculated based on the room temperature Tr which is external information of the gas furnace 1 and the set heating temperature Th, the control method of the gas furnace according to the embodiment of the present invention has an advantage that it is possible to be operated in conjunction with a temperature control device which can not transmit the external information to the gas furnace 1.

In addition, since the room temperature Tr and the intake air temperature Ti may be different from each other as the gas furnace 1 is provided in a space (e.g., a basement) remote from the room which is a heating target space, adjusting the thermal power of the gas furnace 1 based on the internal information of the gas furnace 1 as in the present invention has the advantage that the thermal power control sensitivity, the accuracy, and the reliability can be improved.

The weak heating capacity calculation step S30 may be roughly divided into the steps S33, S34 and S36 of setting the reference temperature Ts, and a step S39 of calculating the weak heating capacity based on the intake air temperature Ti and the reference temperature Ts and, first, the steps S33, S34, and S36 of setting the reference temperature Ts will be described as follows.

If it is determined at step S20 that the heating signal W is the weak heating signal W1, a step S31 of determining whether the gas furnace 1 is operating according to a previously received certain heating signal (hereinafter referred to as a previous signal) V may be performed.

If it is determined at step S31 that the gas furnace 1 is not operating (i.e., not in operation), a step S35 of sucking air into the gas furnace 1 for a certain time and a step S36 of setting the reference temperature Ts may be performed sequentially.

The step S35 may be a step of operating the blower 3 to suck air into the gas furnace 1.

As shown in FIG. 3, after the blower 3 is operated for a certain time tb at step S35, the step S36 of setting a first reference temperature Ts1 based on the intake air temperature Ti after the certain time tb may be performed.

Setting the first reference temperature Ts1 based on the intake air temperature Ti after the certain time tb at step S36 is intended to reduce the difference in the state (particularly, the temperature) of the air existing in each of the indoor space due to the non-operating state of the gas furnace 1 and the intake portion of the gas furnace 1, by circulating the air.

Thus, the intake air temperature Ti after the certain time tb at step S36 may not be significantly different from the room temperature Tr at a corresponding time.

As an example, the air suction into the gas furnace 1 can be continued for about 15 to 45 seconds by using the blower 3.

Meanwhile, the operation time of the blower 3 mentioned above is just only a time related to the setting of the reference temperature Ts, and it is obvious that the blower 3 can continue to operate so as to supply the heating air to the room even after the reference temperature Ts is set.

If it is determined at step S31 that the gas furnace 1 is in operation, the step S32 of determining whether the previous signal V is the weak heating signal W1 or the strong heating signal W2 may be performed.

If it is determined at step S32 that the previous signal V is the weak heating signal W1 and that the heating signal W is also the weak heating signal W1 without a signal change, the step S33 of setting the reference temperature Ts to the reference temperature at the previous signal V may be performed.

If it is determined at step S32 that the previous signal V is the strong heating signal W2 and the heating signal W is the weak heating signal W1 as signal is changed, the step S34 of setting a second reference temperature Ts2 based on the intake air temperature Ti at the time point of signal change may be performed.

In the above, in order to explain that the reference temperatures set in steps S33, S34, and S36 may be different from each other, the reference numerals of the reference temperature are denoted differently by Ts, Ts2, and Ts1. However, for the sake of simplicity, the reference numerals of the reference temperature are all unified into Ts.

Regarding the above, the present invention may further include a step S38 of storing the reference temperature Ts set in the steps S33, S34 and S36. The step S38 may be performed through a storage medium provided in the gas furnace 1.

After the steps S33, S34 and S36, a step S39 of calculating the weak heating capacity according to the difference between the intake air temperature Ti and the reference temperature Ts may be performed. The step S39 may be performed based on the reference temperature Ts stored in the step S38.

The weak heating capacity calculated in the step S39 may be varied in a stepwise manner according to the magnitude of a value Td (hereinafter, referred to as a temperature difference) obtained by subtracting the intake air temperature Ti from the reference temperature Ts, based on a preset starting capacity.

If the temperature difference Td is within a first reference range, the weak heating capacity may be maintained equal to the starting capacity. If the temperature difference Td is within a second reference range which is larger than the first reference range, a certain ratio may be increased from the starting capacity. If the temperature difference Td is within a third reference range which is smaller than the first reference range, a certain ratio may be reduced from the starting capacity.

As an example, as shown in FIG. 4, the first reference range may be −0.5 to 0.5° F., the second reference range may be divided into three sections at 0.5° F. intervals, and the third reference range may be divided into two sections at 0.5° F. intervals, and the weak heating capacity with respect to the starting capacity may be calculated according to each section.

For example, if the room temperature Tr is 72° F. and the set heating temperature Th is 79° F., the thermostat may transmit the strong heating signal W2 to the gas furnace 1. Thus, the gas furnace 1 may be operated at the maximum heating capacity.

Thereafter, when the room temperature Tr rises to 78° F., the thermostat may transmit a weak heating signal W 1 to the gas furnace 1.

In this case, the reference temperature Ts is set to 78° F. When the intake temperature Ti is 77° F., the heating operation is performed with a capacity increased by 3% with respect to the starting capacity. When the intake temperature Ti becomes 78° F., after time is elapsed, the heating operation may be performed with the starting capacity. Then, after time is elapsed, when the intake air temperature Ti becomes 80° F., the heating operation may be performed with a capacity reduced by 5% with respect to the starting capacity. Then, after time is elapsed, when the intake temperature Ti becomes 78° F., the heating operation may be performed again with the starting capacity.

Thus, it is possible to prevent the fuel gas R from being consumed more than necessary by controlling the weak heating capacity in a stepwise manner according to the current load (i.e., the temperature difference), and the thermal comfort in the room can be improved by maintaining the room temperature Tr close to the set heating temperature Th.

Meanwhile, after the step S40 or the step S50, a step S9 of turning off the gas furnace may be performed.

At step S9, when a power-off signal of the gas furnace 1 is inputted, the gas furnace 1 may be turned off.

At step S9, when the power-off signal of the gas furnace 1 is not inputted, the process may return to step S10.

According to the present invention, there are one or more of the following effects.

First, by calculating the weak heating capacity in a stepwise manner according to the difference between the intake air temperature and the reference temperature, the gas furnace is operated at the heating capacity corresponding to the current load, so that the room temperature can be maintained close to the set temperature.

Second, when calculating the weak heating capacity, by using the intake air temperature which is internal information of the gas furnace and the reference temperature information, the gas furnace can adjust its heating capacity in a stepwise manner.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

What is claimed is:

1. A method for controlling a gas furnace that performs heating operation, the method comprising:
   receiving a first heating signal;
   calculating a certain heating capacity smaller than a maximum heating capacity of the gas furnace, according to the first heating signal; and
   operating a heating of the gas furnace with the calculated certain heating capacity, wherein the calculating of the certain heating capacity comprises calculating the certain heating capacity according to a difference between an intake air temperature sucked into the gas furnace and a reference temperature, wherein the intake air temperature is variable over time, wherein the reference temperature is set to a specific temperature higher than a specific intake air temperature at a certain time point among the variable intake air temperature, and wherein the certain heating capacity is varied in a stepwise manner according to a magnitude of a temperature difference obtained by subtracting the intake air temperature from the reference temperature, based on a preset starting capacity.

2. The method of claim 1, wherein the reference temperature is set to a temperature higher than the intake air temperature by 0.5 to 2.5° F. at the certain time point.

3. The method of claim 1, wherein the step (c) calculating of the certain heating capacity further comprises:
   determining whether the gas furnace is in operation according to a previous signal;
   determining whether the previous signal is the first heating signal or a second heating signal which causes an operation of the gas furnace at the maximum heating capacity, when the gas furnace is in operation;
   calculating the certain heating capacity according to a difference between the intake air temperature and the reference temperature, wherein the reference temperature becomes a reference temperature in the previous signal, when the previous signal is the weak first heating signal; and
   calculating the certain heating capacity according to the difference between the intake air temperature and the reference temperature, wherein the reference temperature is set based on the intake air temperature at a time point of signal change, when the previous signal is the second heating signal.

4. The method of claim 3, wherein the step (c) calculating of the certain heating capacity further comprises:
   sucking air into the gas furnace for a certain time, if the gas furnace is not in operation; and
   calculating the certain heating capacity according to the difference between the intake air temperature and the reference temperature, wherein the reference temperature is set based on the intake air temperature after the certain time.

5. The method of claim 4, wherein sucking air into the gas furnace is maintained for 15 to 45 seconds using a blower provided in the gas furnace.

6. The method of claim 1, wherein the certain heating capacity is maintained to be identical with the starting capacity, when the temperature difference is within a first reference range.

7. The method of claim 6, wherein the certain heating capacity is increased by a certain ratio from the starting capacity when the temperature difference is within a second reference range which is larger than the first reference range.

8. The method of claim 6, wherein the certain heating capacity is reduced by a certain ratio from the starting capacity when the temperature difference is within a third reference range which is smaller than the first reference range.

9. The method of claim 1, further comprising
   storing the reference temperature, wherein the calculating of the certain heating capacity comprises calculating the certain heating capacity based on the stored reference temperature.

10. The method of claim 1, further comprising
    receiving a second heating signal which causes an operation of the gas furnace at the maximum heating capacity; and
    operating a heating of the gas furnace at the maximum heating capacity of the gas furnace, according to the second heating signal.

* * * * *